United States Patent [19]

McHugh et al.

[11] 3,830,972

[45] Aug. 20, 1974

[54] SENSITIVITY COMPENSATION FOR A SELF SCANNED PHOTODIODE ARRAY

[75] Inventors: Michael McHugh Siverling; Melvin George Wilson, both of Rochester, Minn.

[73] Assignee: International Business Machines Corporation, Armonk, N.Y.

[22] Filed: Nov. 13, 1972

[21] Appl. No.: 306,135

[52] U.S. Cl. ............ 178/7.1, 178/7.2, 178/DIG. 29, 178/DIG. 27

[51] Int. Cl. ............ H04n 3/14

[58] Field of Search ............ 178/7.1, 7.2, DIG. 29, 178/DIG. 28, DIG. 22

[56] References Cited

UNITED STATES PATENTS 2,965,711 12/1960 James et al. ............ 178/7.2

*Primary Examiner*—Howard W. Britton
*Assistant Examiner*—Edward L. Coles
*Attorney, Agent, or Firm*—Donald F. Voss

[57] ABSTRACT

Light from a high frequency light source is directed onto a self-scanned photodiode array positioned to reflectively scan a document illuminated by a document light source. The differences in sensitivities of the diodes forming the photodiode array modulate the signal generated in response to the high frequency light source. The video output signal from the photodiode array includes the modulated high frequency component and the video information component varying with sensitivity. The two components are separated by high and low pass filters. The separated modulated high frequency component is demodulated to form a signal proportional to diode sensitivity. The separated video information signal varying with sensitivity is divided by the signal proportional to sensitivity to eliminate sensitivity variance from diode to diode in the video information signal.

7 Claims, 2 Drawing Figures

SENSITIVITY COMPENSATION FOR A SELF SCANNED PHOTODIODE ARRAY

BACKGROUND OF THE INVENTION

1. Field of the Invention

This invention relates to circuitry for providing sensitivity compensation and more particularly to circuitry for compensating for differences in sensitivity of photodiodes in a photodiode array and still more particularly to circuitry for compensating for differences in sensitivity of photodiodes in a self-scanned diode array.

The present invention is particularly useful in systems for scanning documents containing information which is to be processed such as in an optical character recognition system. In these systems, the self-scanning photodiode array may consist of more than 256 photodiode elements which may be on 2 mil centers. However, the tolerance on the relative sensitivities of the photodiode elements is as high as ±8 percent for a typical 64 element array. Because of noise and thresholding requirements in the video digitizing system, amplitude errors of large magnitude due to these large differences in photodiode sensitivities are intolerable. Hence, sensitivity compensation is imperative.

2. Description of the Prior Art

In the past it has been the practice to connect the output of each photodiode of a photodiode array to an associated amplifier and adjust the amplifier to compensate for the sensitivity of the photodiode. The outputs of the photodiodes were applied in parallel to the associated amplifiers. The present invention provides sensitivity compensation for each photodiode of an array of photodiodes where the outputs of the photodiodes are applied serially to a single amplifier. A serial scanned photodiode array is not only less expensive than a parallel output photodiode array but in high resolution photodiode arrays such as self-scanned photodiode arrays, parallel outputs are not available. Therefore, because the photodiodes are scanned serially, the sensitivity compensation must take place dynamically. However, instead of varying the gain of the amplifier dynamically for each photodiode, the present invention makes the sensitivity compensation prior to the video signal reaching the amplifier. This is done by generating a compensation signal proportional to the sensitivity of the photodiodes. The video information signal from the photodiodes is then divided by the compensation signal to provide a corrected or compensated video information signal.

SUMMARY

The principal objects of the present invention are to provide an improved sensitivity compensation circuit for a photodiode array which: (a) dynamically compensates for photodiode sensitivity; (b) provides relatively low cost sensitivity compensation; and (c) eliminates digital parallel to serial conversion.

The foregoing objectives are achieved by pulsing a light source at a high frequency compared to the scan rate of the photodiode array. This high frequency light source is directed at the photodiode array. The photodiode array produces a resultant video signal having a high frequency component modulated by photodiode sensitivity and a lower frequency video information signal component. The two components contained in the resultant signal emanating from the photodiode array are separated. The high frequency component is demodulated to provide a compensation signal proportional to photodiode sensitivity. Compensation is achieved by dividing the video information component by the demodulated high frequency component.

DESCRIPTION

Figure 1:
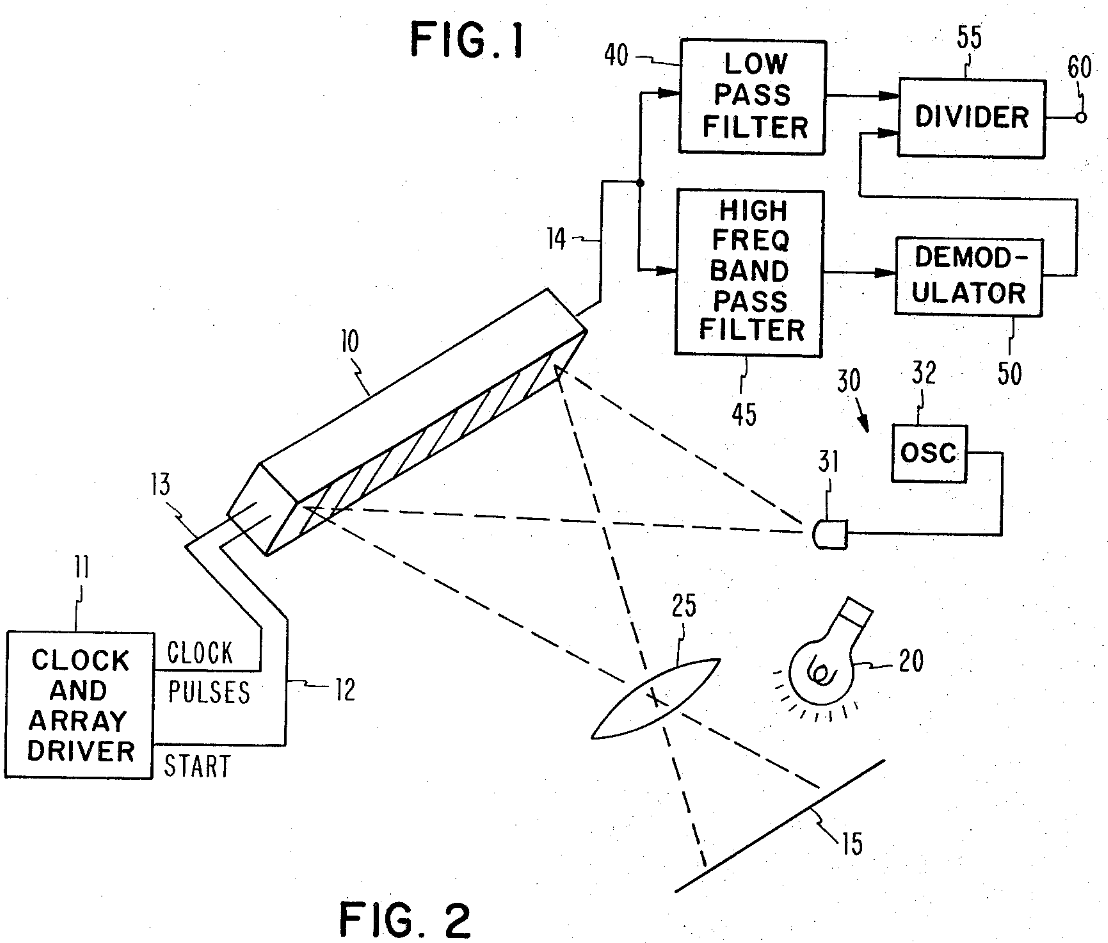
FIG. 1 is a schematic diagram illustrating a preferred embodiment of the invention.

With reference to the drawings and particularly to FIG. 1, the invention is illustrated by way of example as including photodiode array 10 positioned to scan document 15 which is moving relative thereto. Document 15 is illuminated by light source 20. The light reflected from document 15 is imaged unto the photodiode array 10 by lens 25. The particular system of optics for collecting light reflected by the document and directing it unto the photodiode array 10 and the transport apparatus for moving the document 15 relative to photodiode array 10 are not significant so far as the present invention is concerned and therefore only a representative system is shown.

Self-scanned photodiode arrays are commercially available. The invention, however, is not limited to a self-scanned photodiode array but is applicable to any photodiode array where the output is taken serially from the array. The invention, although it is not preferable to do so, is also applicable to an arrangement where the outputs from the array are in parallel and there is a compensation circuit provided for each photodiode of the array. This not only requires a compensation circuit for each photodiode but requires a plurality of switches between the compensation circuits and the circuit for performing video correction.

Self-scanned diode arrays include a clock and a driver circuit as shown by block 11. The clock and array driver circuit 11 provides a start pulse to array 10 over conductor 12 and clock pulses on conductor 13. The clock may be either externally driven or free-running. Its repetition rate is set equal to the desired scan rate. The scan is initiated by the start pulse which is coincident with the clock pulse. The serial output from photodiode array 10 appears on conductor 14. It should be noted that an external amplifier, not shown, could be used depending upon the scan rate. Usually the amplifier is integrated with the photodiode array. If an external amplifier is used, then the integrated internal amplifier serves as a pre-amplifier. The scan rate for example may be 3.2 MHz.

Photodiode array 10 is also uniformly illuminated by high frequency light source 30 which consists of light emitting diode 31 pulsed by oscillator 32. The frequency of oscillator 32 must be sufficiently greater than the scan rate of photodiode array 10 so that the resultant signal appearing on conductor 14 can be separated by low pass filter 40 and high frequency band pass filter 45. As a practical matter, the frequency of oscillator 32 should be at least five times the frequency of clock 11 and preferably an order of magnitude greater. Hence, if the scan rate is 3.2 MHz, then the frequency of oscillator 32 preferably would be 32 MHz.

The light from light emitting diode 31 should uniformly illuminate the photodiode array 10 and should be shielded from document 15. No optical components are shown for directing the light from light emitting diode 31 to the photodiode array 10, however, as a practical matter, suitable lenses, mirrors or fiberoptic light bundles would be used.

The video signal on conductor 14 has a high frequency component generated in response to the high frequency light source 31 which is modulated by the differences in photodiode sensitivities and a video information component resulting from light reflected by document 15. The amount of light from light source 20 reflected by document 15 is varied by the printed or written information on a document.

Figure 2:
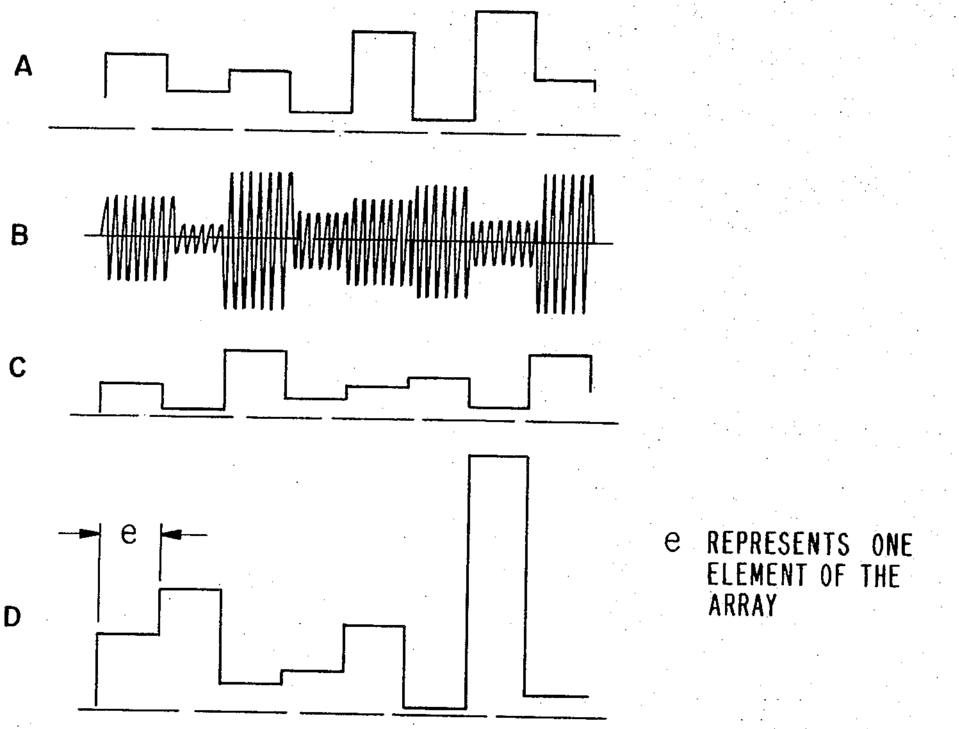
FIG. 2 is a waveform diagram showing the uncorrected video information signal, the modulated high-frequency component signal, the demodulated high-frequency component and the corrected video signal.

The two components of the resultant video signal appearing on conductor 14 are separated by filters 40 and 45. Filter 40 is a low pass filter and passes the uncorrected video information signal shown as waveform A in FIG. 2. The high frequency band pass filter 45 passes the modulated high frequency signal shown as waveform B in FIG. 2. The high frequency signal component, i.e., waveform B is demodulated by demodulator 50. The demodulated signal is shown as waveform C in FIG. 2. The demodulated signal is proportional to sensitivity and it is applied to divider 55 together with the uncorrected video information signal passed by filter 40. The sensitivities of the photodiodes are thus divided out by divider 55, FIG. 1, and a serial corrected video information signal appears as waveform D, FIG. 2, at the output 60 thereof.

Filters 40 and 45 and demodulator circuit 50 are of the type well-known in the art and therefore are not shown in detail. Divider circuit 55 is also of the type well-known in the art, however, it is preferably of the type shown and described in U.S. Pat. No. 3,626,092 dated Dec. 7, 1971 for Video Amplifier For Optical Scanners. The division is performed by first converting the signals to logarithmic form and then substracting the logarithmic representations by means of a differential amplifier.

The corrected video information signal is an analog signal. This corrected video information signal is then processed in a well-known manner for recognizing the characters or patterns scanned by photodiode array 10. The circuitry for performing the recognition is not pertinent to the invention and therefore is not shown or described.

From the foregoing, it is seen that the sensitivity variance from diode to diode of the diodes forming the photodiode array is eliminated. Further, it is seen that the circuitry for eliminating the sensitivity variance is automatic and is relatively low cost. It is also seen that the sensitivity compensation takes place dynamically.

What is claimed is:

1. Sensitivity compensation apparatus for a serial scanned photodiode array comprising a high frequency light source positioned to uniformly illuminate said photodiode array, means for serially scanning said photodiode array at a scan rate sufficiently lower than the frequency of said high frequency light source to enable separation of the resultant serial video signal from said photodiode array into a video information signal component and a modulated photodiode sensitivity compensation component, means for separating said resultant serial video signal into a video information signal component and a modulated photodiode sensitivity compensation component, means for demodulating said modulated photodiode sensitivity compensation component, and means responsive to said video information signal component and said demodulated sensitivity compensation component for providing a compensated video information signal.

2. The sensitivity compensation apparatus of claim 1 wherein said high frequency light source is a light emitting diode and an oscillator for opening said light emitting diode.

3. The sensitivity compensation apparatus of claim 1 wherein said scan rate is an order of magnitude less than the frequency of said light source.

4. The sensitivity compensation apparatus of claim 1 wherein said means for separating said resultant serial video signal into a video information signal component and a modulated photodiode sensitivity compensation component includes a high frequency ban pass filter and a low pass filter.

5. The sensitivity compensation apparatus of claim 1 wherein said means for providing said compensated video information signal is a signal divider circuit.

6. Sensitivity compensation apparatus for a serially scanned photodiode array having a serial video information output comprising:

means for generating a compensation signal modulated by photodiode sensitivity simultaneously with the generation of said serial video information output, means for demodulating said compensation signal to provide a signal proportional to photodiode sensitivity, and means responsive to said signal proportional to photodiode sensitivity and the serial video information signal from said photodiode array for providing a compensated video information signal.

7. Sensitivity compensation apparatus for a serially scanned photodiode array having a serial video information output comprising:

means for generating a serial compensation signal proportional to photodiode sensitivity variances simultaneously with the generation of said serial video information output, and means responsive to said serial compensation signal and said serial video information signal for providing a compensated video information signal.

* * * * *